US012784708B1

(12) United States Patent
Kapinos et al.

(10) Patent No.: US 12,784,708 B1
(45) Date of Patent: Nov. 3, 2026

(54) INFORMATION PROCESSING APPARATUS AND CONTROL METHOD

(71) Applicant: Lenovo (United States) Inc., Morrisville, NC (US)

(72) Inventors: Robert J Kapinos, Morrisville, NC (US); Scott Li, Morrisville, NC (US); Robert James Norton, Jr., Morrisville, NC (US); Igor Stolbikov, Morrisville, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 19/343,996

(22) Filed: Sep. 29, 2025

(51) Int. Cl.
*G09G 5/00* (2006.01)
*G09G 5/02* (2006.01)
*G09G 5/10* (2006.01)

(52) U.S. Cl.
CPC ............... *G09G 5/003* (2013.01); *G09G 5/02* (2013.01); *G09G 5/10* (2013.01); *G09G 2320/0626* (2013.01); *G09G 2320/0666* (2013.01); *G09G 2320/0693* (2013.01); *G09G 2360/144* (2013.01)

(58) Field of Classification Search
CPC ............ G09G 5/003; G09G 5/02; G09G 5/10; G09G 2320/0626; G09G 2320/0666; G09G 2320/0693; G09G 2360/144
See application file for complete search history.

(56) References Cited

U.S. PATENT DOCUMENTS

2006/0170702 A1* 8/2006 Paquette ................. G06T 11/10 345/590
2007/0067124 A1* 3/2007 Kimpe ................. G09G 3/2092 702/67
2011/0032266 A1* 2/2011 Harbach .................. G09G 3/20 345/589
2013/0016081 A1* 1/2013 Park ....................... G09G 3/006 345/207
2018/0040307 A1* 2/2018 Mclin .................... G09G 5/393
2020/0058248 A1* 2/2020 Ha ........................... G09G 3/32
2021/0074239 A1* 3/2021 Tao ........................... G06T 1/20
2021/0097955 A1* 4/2021 Nicholson ............ G01J 3/0202
(Continued)

FOREIGN PATENT DOCUMENTS

EP 3661198 A1 * 6/2020 ........... G09G 3/2003

*Primary Examiner* — Cory A Almeida
(74) *Attorney, Agent, or Firm* — Osha Bergman Watanabe & Burton LLP

(57) ABSTRACT

An information processing apparatus includes a calibratable display that operates according to an adjustable brightness value and an adjustable color value, a memory that stores instructions, and a processor that executes the instructions. The processor executes the instructions to receive a display calibration request comprising a requested brightness value and a requested color value of the display from each of a plurality of applications registered in a registry of display-calibration-consuming applications of the memory. The processor further executes the instructions to calculate a calibration of the display that denies at least a subset of the display calibration requests based on the display calibration requests and a predetermined set of calibration rules. In addition, the processor executes the instructions to adjust the brightness value and the color value of the display based on the calibration.

18 Claims, 5 Drawing Sheets

(56) References Cited

U.S. PATENT DOCUMENTS

| | | | | |
|---|---|---|---|---|
| 2021/0124174 | A1* | 4/2021 | Tokunaga | G02B 27/0172 |
| 2023/0112823 | A1* | 4/2023 | Rauen | G06F 3/0482 715/722 |
| 2024/0046835 | A1* | 2/2024 | Zhang | G09G 3/20 |

* cited by examiner

INFORMATION PROCESSING APPARATUS AND CONTROL METHOD

BACKGROUND

Calibrated displays monitors are carefully designed to reproduce colors, brightness, contrast, and other visual characteristics according to a predefined standard. As users and professionals increasingly demand better visual accuracy and performance, these displays have grown in popularity. Consequently, modern calibrated displays may incorporate a variety of hardware components and software features that attempt to control the output of the display and its appearance. However, the hardware components and software features may require different conflicting calibrations of the display.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments of the present disclosure relate to an information processing apparatus. The information processing apparatus includes a calibratable display that operates according to an adjustable brightness value and an adjustable color value, a memory that stores instructions, and a processor that executes the instructions. The processor executes the instructions to receive a display calibration request comprising a requested brightness value and a requested color value of the display from each of a plurality of applications registered in a registry of display-calibration-consuming applications of the memory. The processor further executes the instructions to calculate a calibration of the display that denies at least a subset of the display calibration requests based on the display calibration requests and a predetermined set of calibration rules. In addition, the processor executes the instructions to adjust the brightness value and the color value of the display based on the calibration.

In general, in one aspect, embodiments of the present disclosure relate to a method of controlling a calibratable display of an information processing apparatus that operates according to an adjustable brightness value and an adjustable color value. The method includes receiving a display calibration request comprising a requested brightness value and a requested color value of the display from each of a plurality of applications registered in a registry of display-calibration-consuming applications of a memory of the information processing apparatus. The method further includes calculating a calibration of the display that denies at least a subset of the display calibration requests based on the display calibration requests and a predetermined set of calibration rules. In addition, the method includes adjusting the brightness value and the color value of the display based on the calibration.

DETAILED DESCRIPTION

Figure 1:
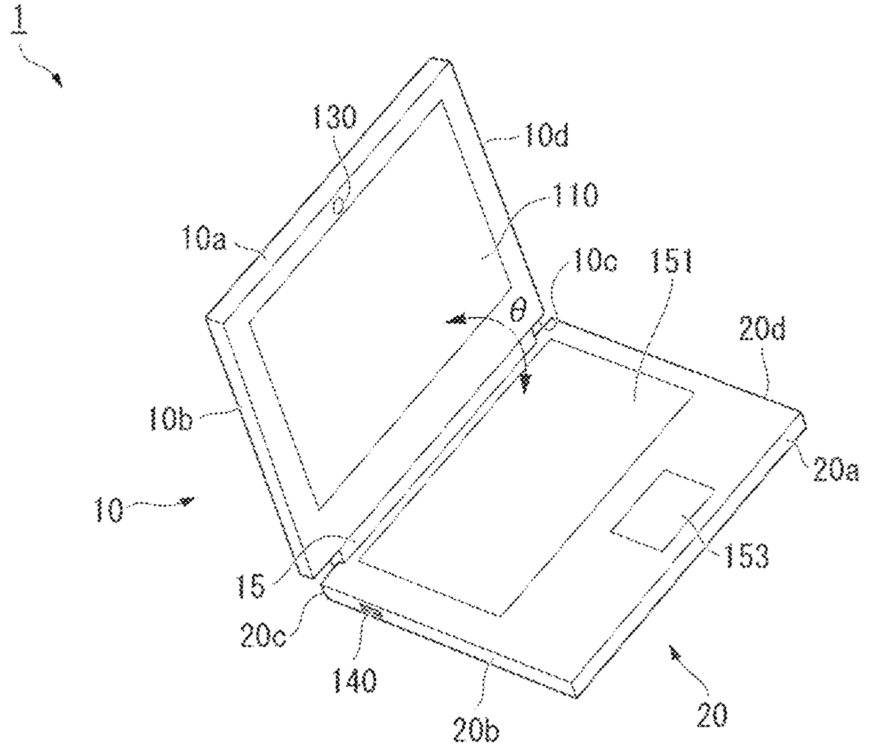
FIG. 1 depicts an information processing apparatus according to one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

Conventional information processing apparatuses include personal computers like desktop computers and laptop/notebook computers, smart phones, personal data assistants (PDAs), and tablet computing devices. Today, many of these information processing apparatuses include a calibratable display that reproduces colors, brightness, contrast, and other visual characteristics according to a predefined standard. Such displays can adjust their brightness and color for a specific use. For example, a calibratable display of an information processing apparatus used for high-performance video game competition may be calibrated to increase brightness and contrast to show details that may provide a competitive edge. As another example, a calibratable display of an information processing apparatus used for digital photography editing may be calibrated to reproduce colors with strict accuracy. Some information processing apparatuses are configured for presence detection and dim the brightness of the display in the absence of detecting a user. Evidently, different uses may require different calibrations of the display that may conflict.

Embodiments of the present disclosure provide an information processing apparatus that includes a calibratable display that operates according to an adjustable brightness value and an adjustable color value, a memory (e.g., a non-transitory computer-readable medium), and a processor. Instructions are stored in memory that, when executed by the processor, cause the processor to manage and respond to a plurality of display calibration requests according to a predetermined set of calibration rules. Consequently, embodiments of the present disclosure provide users with a controlled and predictable visual performance of the calibrated display, despite conflicting requests to change the appearance of the display.

FIG. 1 depicts an information processing apparatus (1) according to one or more embodiments of the disclosure. The information processing apparatus (1) is shown in a perspective view. As described above, the information processing apparatus (1) may be a personal computer, desktop computers, laptop/notebook computers, smart phone, PDA, tablet computing device, or another type of information processing apparatus. For illustration only, the information processing apparatus (1) is depicted as a laptop PC (Personal Computer). A laptop PC may also be referred to as a notebook computer and includes conventionally designed "clamshell" laptops as well as 2-in-1 PCs (e.g., a computer that functions as both a laptop and a tablet), detachable PCs (i.e., laptops with detachable keyboards) and other variants known in the art.

The information processing apparatus (1) includes a first chassis (10) and a second chassis (20) joined by a hinge (15). The first chassis (10) is rotatable relative to the second chassis (20) around the rotation axis of the hinge (15). An angle between the first chassis (10) and the second chassis (20) is denoted by "θ" in FIG. 1. The first chassis (10) may be referred to as an A cover or a display chassis, while the second chassis (20) may be referred to as a C cover or a system chassis. As depicted, the first chassis (10) and second chassis (20) each have a respective first side face (10*a*, 20*a*), second side face (10*b*, 20*b*), third side face (10*c*, 20*c*), and fourth side face (10*d*, 20*d*) defining an outer boundary of the information processing apparatus (1).

FIG. 1 illustrates an example of an "open" state of the information processing apparatus (1). Generally, in an open state, the first side face (10*a*) of the first chassis (10) and the first side face (20*a*) of the second chassis (20) are separated (i.e., θ>0). In the open state, the respective inner surfaces of the first chassis (10) and the second chassis (20) are visible. The information processing apparatus (1) is generally used in a state where the hinge angle is typically about θ=100° to 130°. The hinge angle θ may be to any value selected by a user by adjusting the position of the first chassis (10) relative to the second chassis (20). In some 2-in-1 computers, the hinge angle θ may be set to a value of 180° or greater.

The information processing apparatus (1) includes a power button (140) on the side face (20*b*) of the second chassis (20). The power button (140) is an element operated by the user transmit a command to the information processing apparatus (1) to power on or power off, transition from a standby state to a normal operating state, transition from the normal operating state to the standby state, or to activate another state.

A normal operating state is an operating state in which the information processing apparatus (1) is capable of processing data without particular limitation, for example, corresponding to the S0 state defined in the Advanced Configuration and Power Interface (ACPI) specification. A standby state is a state in which at least part of the system processing is limited, and power consumption is lower than that in the normal operating state. For example, the standby state may be a sleep state, modern standby in Windows™, or a state corresponding to S3 state (sleep state) defined in the ACPI specification. Additional examples of standby states include a state in which at least the calibratable display (110) appears to be OFF, and in which the calibratable display (110) displays a lock state that prohibits using the information processing apparatus (1) without first unlocking it.

The information processing apparatus (1) also includes a keyboard (151) and a touch pad (153) on the inner face of the second chassis (20) as an input device. The information processing apparatus (1) may also include external connected devices (not shown) such as an external keyboard.

As depicted in FIG. 1, a camera (130) is disposed in a peripheral area of the calibratable display (110) on the inner face of the first chassis (10) (e.g., along an outer edge of the first chassis (10) opposite the hinge (15)). However, in other embodiments, the camera (130) may be disposed on another component of the information processing apparatus (1), for example, in the corners of the calibratable display (110) or on the second chassis (20). The camera (130) may have a predetermined resolution (e.g., 720p-1080p) and may include a standard red-green-blue (RGB) camera, an infrared camera, and other ranging sensors (e.g., a time-of-flight sensor). In addition, although only one camera (130) is shown, embodiments of the present disclosure may include multiples cameras. For example, the information processing apparatus (1) may include an external camera (not shown) connected to the information processing apparatus (1) with functionality to obtain images and record video from either the camera (130) embedded within the information processing apparatus (1) or from the external camera. The information processing apparatus (1) make also include additional light sensing devices such as an ambient light sensor that uses a photoresistor, photodiode, or a phototransistor.

A calibratable display (110) is provided on an inner face of the first chassis (10). As described above, the calibratable display (110) is a display that operates according to adjustable visual characteristics and reproduces an appearance based on a predefined standard. To do so, the calibratable display (110) operates according to one or more of an adjustable brightness value, an adjustable color value (e.g., both color accuracy and color gamut), an adjustable contrast value, an adjustable white point value, and an adjustable gamma value. The calibratable display (110) may be a liquid crystal display (LCD), a light emitting diode (LED) display, an organic electroluminescence (EL) display, an organic LED display (OLED), a microLED display, a quantum dot variant of one of the aforementioned types of displays (e.g., QLED, QD-OLED, QD-EL), or another type of display.

The visual characteristics of the calibratable display (110) are adjusted by multiple hardware components (not shown) including lookup tables (LUTs) that store color correction curves, variable backlight controls for brightness adjustments, controllable color filters, voltage regulators for pixel control, and other adjustable components known in the art. Software, stored in memory of the information processing apparatus (1), communicates requests to adjust the calibratable display (110) through standardized interfaces (e.g., Display Data Channel (DDC/CI) protocols). The information processing apparatus (1) manages and oversees the response to these requests, as described below.

Figure 2:
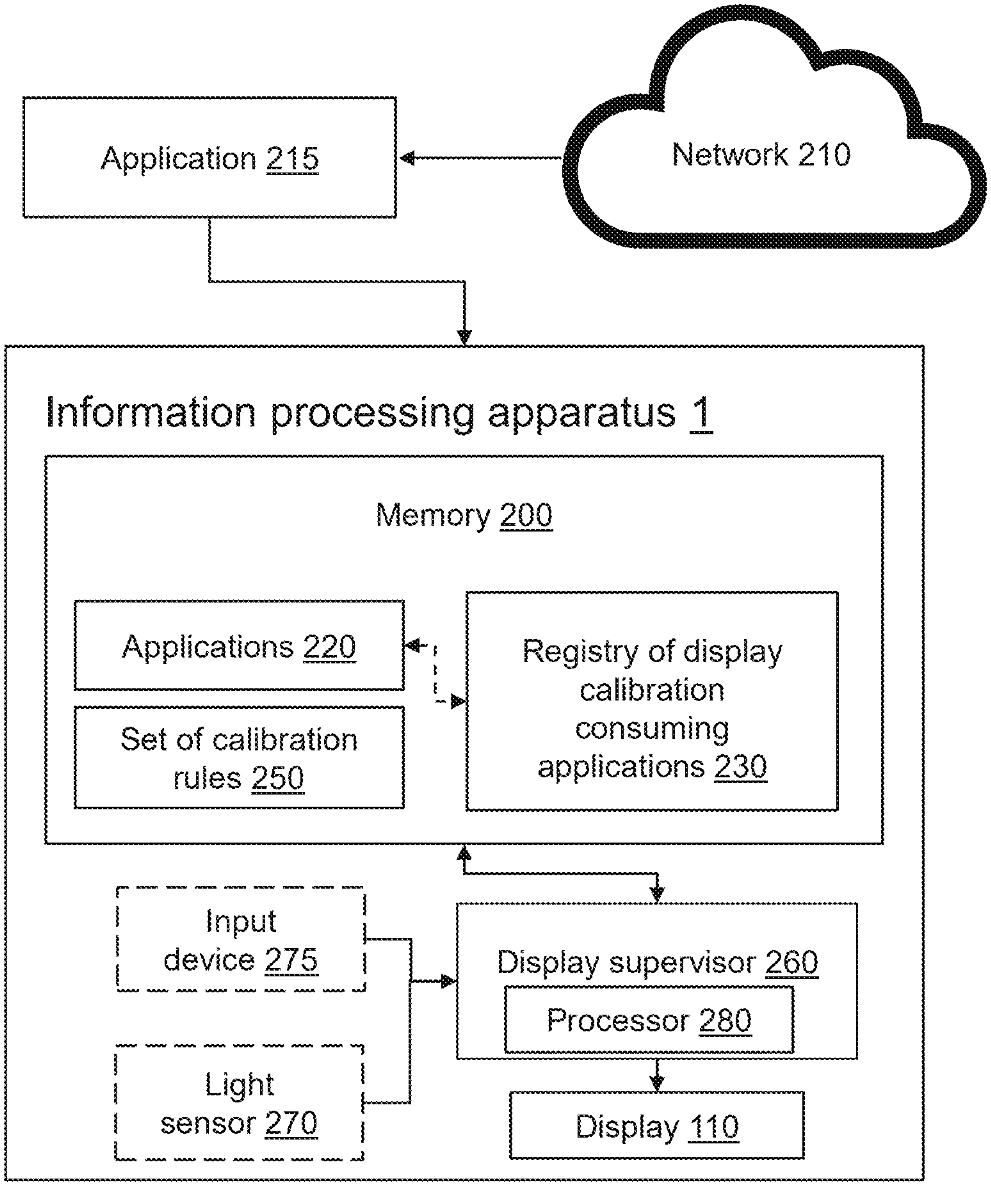
FIG. 2 depicts a block diagram of an information processing apparatus according to one or more embodiments of the disclosure.

FIG. 2 depicts a block diagram of an information processing apparatus (1) in accordance with one or more embodiments. Although several components illustrated in FIG. 1 are not shown in FIG. 2, a person of ordinary skill in the art will appreciate that the information processing apparatus (1) of FIG. 2 may include additional components, including those illustrated in FIG. 1 and described above.

The information processing apparatus (1) includes a processor (280) and a memory (200), for example a non-transient computer readable medium and/or a random-access memory (RAM). At least a portion of the memory (200) is a non-transitory computer-readable medium. Instructions are stored in the memory (200) that, when executed by the processor (280), cause the processor (280) to perform certain functions. The processor (280) may include one or more central processing units (CPUs), graphics processing units (GPUs), and/or chipsets configured to read and write information to the memory (200). Accordingly, utilizing one or more specific hardware components, the processor (280) is configured to access the memory (200) and execute computer-readable instructions stored thereon.

In accordance with one or more embodiments, the processor (280) is part of a display supervisor (260) that is a controller of the display (110) of the information processing apparatus (1). The display supervisor (260) controls various processes of the information processing apparatus (1) and may encompass several computer hardware components, including an embedded controller or microcontroller and/or the main processing unit of the information processing apparatus.

The display supervisor (260) calculates a calibration of the display (110) based in part on requests transmitted by applications (220) stored in the memory (200). Various types of applications (220) are stored in the memory (200). An application is software that implements algorithms and logic to provide specific functionality or services tailored to the needs of users or particular use cases of the information processing apparatus (1). One application may refer to one or more components, modules, or distinct applications, etc. Applications (220) may be pre-installed on the information processing apparatus (1) by a manufacturer or vendor and additional applications may be downloaded from a network (210) and installed in the memory (200). For example, the information processing apparatus (1) may communicate with other devices (e.g., other information processing apparatuses) by way of the network (210). The network (210) may be a Wi-Fi® network, a cellular network, a satellite communicate network, or another type of network. In FIG. 2, an application (215) is downloaded from the network (210) and installed in the memory (200). In some embodiments, the information processing apparatus (1) can receive requests over the network (210) from a client application, for example, a client application executing on another information processing apparatus such as the database. In addition, a person of ordinary skill in the art will appreciate that applications may be downloaded and installed from other sources (e.g., storage devices).

All applications (220) are generally stored in the memory (200). However, applications that require specific display calibrations or consume display calibration resources are registered at install time in a registry of display-calibration-consuming applications (230) of the memory (200). The registry of display-calibration-consuming applications (230) is part of the memory (200) and may include unique monikers for each application that is capable of transmitting display calibration requests (310). The registry of display-calibration-consuming applications (230) may include additional information related to the type of calibration used by each respective application. The display supervisor (260) interacts with the registry of display-calibration-consuming applications (230) when evaluating display calibration requests, as described further below. In one or more embodiments, the registry of display-calibration-consuming applications (230) lists the applications (220) capable of transmitting of display calibration requests, and does not include those that are not capable. Registering each of the applications (220) capable of transmitting display calibration requests in the registry (230) simplifies their management as described further below. In addition, the unique moniker differentiates the applications (220) from one another and from applications (220) that do not transmit display calibration requests enabling additional features, for example, fast lookups of specific predefined calibration settings.

The information processing apparatus (1) or the application itself may determine whether an application should be registered in the registry of display-calibration-consuming applications (230). For example, an application may include installer package metadata, or a manifest, that informs the information processing apparatus (1) that it is an application that consumes display calibration resources. Accordingly, upon installation, the information processing apparatus (1) detects the metadata and registers the application in the registry of display-calibration-consuming applications (230). Such an application may be referred to as a "smart" application because it does not require a user to intervene to determine or decide whether to be registered in the registry of display-calibration-consuming applications (230). Alternatively, or in addition, after downloading and installing an application, the information processing apparatus (1) may detect that the application attempts to utilize a display calibration consuming resource. In response, the information processing apparatus (1) temporarily denies the request and registers the application in the registry of display-calibration-consuming applications (230).

The display supervisor (260) also calculates the calibration of the display (110) based in part on a set of predetermined calibration rules (250) stored in the memory (200). The predetermined set of calibration rules (250) include algorithmic logic and programmatically defined user-preferences that assist in calculating the calibration of the display (110) and managing requests from different applications (220) to change the appearance of the display. Various calibration rules are within the scope of the present disclosure and may be included by the predetermined set of calibration rules (250). In addition, although the calibration rules are referred to as "predetermined," they may be updated by a user or other authorized entity (e.g., a manufacturer or developer).

As one example, the predetermined set of calibration rules (250) may prioritize requests based on the time of the transmission of the request. Depending on the use of the information processing apparatus (1), either the most recent requests or the earliest (oldest) requests may be prioritized. Other methods of prioritizing display calibration requests based on the time of the transmission of the request are also within the scope of the present disclosure.

As another example, the predetermined set of calibration rules (250) may prioritize requests to calibrate the display based on user activity of the application. When multiple applications are in use and requesting to calibrate the display, the application with which the user is currently interacting is prioritized. In some embodiments, a duration of interaction and an elapsed time since the last interaction is measured by the application, and either (or both) may be used to determine which calibration request to prioritize. Other methods of prioritizing display calibration requests based on user activity of the application are also within the scope of the present disclosure.

Many applications include a window that is electronically represented on the display (110) to present information to a user. As another example, the predetermined set of calibration rules (250) may prioritize requests to calibrate the display based on a window area of the application. When multiple applications are in use and requesting to calibrate the display, the application with the largest window size is prioritized.

As another example, the predetermined set of calibration rules (250) may prioritize requests to calibrate the display based on the context of the application in use. In some instances, a calibration of the display is more important for the proper user experience of one application compared to another. For example, a proper calibration of the display may be more important for an image-editing application compared to a text-editing application. The application context may be provided as metadata by the application alongside the calibration request or may be determined by the display supervisor (260) based on the amount or type of calibration resources that are requested. When multiple applications are in use and requesting to calibrate the display, the application with greater calibration context is prioritized. Other methods of prioritizing display calibration requests based on the context of the application are also within the scope of the present disclosure As another example, the predetermined set of calibration rules (250) may prioritize requests to calibrate the display based a user-defined priority of the application. A user may assign a priority value to each of the plurality of applications stored in the registry of display calibration consuming applications (230). When multiple applications are in use and requesting to calibrate the display, the application with the greatest user-defined priority is prioritized. Other methods of prioritizing display calibration requests based on user-defined priority of the application are also within the scope of the present disclosure.

The various calibration rules belonging to the predetermined set of calibration rules (250) may be combined without limitation. For example, where multiple rules are used, each rule may provide a display calibration request with a numerical priority value. The numerical priority values, calculated based on each display rule, may be summed to determine a final priority value for each display calibration request. In addition, each calibration rule may be given a weight to define certain calibration rules as more important than others. As an example, one or more embodiments may include four calibration rules in the predetermined set of calibration rules (250) that each give a respective priority value $R_1$, $R_2$, $R_3$, $R_4$. Each calibration rule may have its own respective weight, e.g., $w_1$, $w_2$, $w_3$, $w_4$. The final priority value of a request, based on each of the four calibration rules, is thus given by the sum $w_1R_1+w_2R_2+w_3R_3+w_4R_4$. The request with the greatest sum of weighted priority values may be selected by the display supervisor (260) and applied to the display (110). A person of ordinary skill in the art will recognize that other methods of calculating weighted sums are not beyond the scope of the present disclosure.

In one or more embodiments, the display supervisor (260) also calculates the calibration of the display (110) based in part on measurements from other hardware devices, such as a user input device (275). The input device (275) may be the keyboard (151) and or touch pad (153) illustrated in FIG. 1, or another input device (including an external input device). As described above, the predetermined set of calibration rules (250) may include prioritizing a display calibration request based on user activity of the application that transmitted the request. In some instances, the application itself may record user activity. However, in other instances, user activity may be measured directly based on commands from the input device (275). As a user interacts with the input device (275) and various applications, the display supervisor (260) may calculate and adjust the display calibration accordingly (e.g., based on the duration of interaction or an elapsed time since the last interaction).

The display supervisor (260) may also calculate the calibration of the display (110) based in part on measurements from a light sensor (270). The light sensor (270) may be an ambient light sensor that uses a photoresistor, photodiode, or a phototransistor. Alternatively, or in addition, the light sensor (270) may include the camera (130) illustrated in FIG. 1. Users may prefer different calibrations of the display (110) in different lighting situations. For example, in bright environments, a user may prefer the display to increase its brightness and contrast to improve visibility. In dim environments, a user may prefer the display to decrease its brightness and use less blue light to protect their eyesight. Accordingly, the display supervisor (260) may use measurements from the light sensor (270) to either modify the selection of display calibration requests, based on the predetermined set of calibration rules (250), or to adjust the selected display calibration request.

In one or more embodiments, and as suggested above, display calibration requests may be transmitted from sources other than applications (220). For example, automatic display-calibration settings associated with the light sensor (270) or other components, defined as default settings or otherwise set by the user, may transmit display calibration requests. Some information processing apparatuses (1) such as these may be configured to automatically dim or brighten the display (110) in response to a user's presence, changes in ambient lighting, or changes in power supply. Users may also define their own calibration settings, for example, dimming the display at certain times of day. A person of ordinary skill in the art will be familiar with other types of automatic display-controlling settings and user-defined settings. The display supervisor (260) does not automatically grant these requests, which may be referred to as "secondary" requests (being secondary to the requests that originate from applications (220)). As described further below, the display supervisor (260) generally operates within a protected kernel space of the memory (200) accessible only by authorized kernel-mode components of an operating system of the information processing apparatus (1). In some embodiments, the display supervisor (260) may alternatively or additionally operate at a hardware level of the information processing apparatus (1). As a consequence of being integrated at a low hierarchical level, the display supervisor (260) intercepts and evaluates all such requests to change the calibration of the display (110) to determine, based on the predetermined set of calibration rules (250), whether they are executed or denied.

In view of the above, the predetermined set of calibration rules (250) may also include rules for evaluating attempts to control the calibration of the display (110) from hardware components, default settings, and other user-defined settings (that is, attempts originating from sources other than the applications (220)). For example, such requests from sources other than the applications (220) may be treated similarly to requests from applications and be evaluated based on the time of the transmission of the request, based on user activity, and user-defined priority.

As one example, the predetermined set of calibration rules may include a rule to always prioritize display calibration requests from applications (220) over secondary display calibration requests. Accordingly, an automatic attempt to change the calibration of the display based on a default setting of dimming the display at a certain time of day may be given a low priority, thereby prioritizing display calibration requests from applications (220) over the secondary display calibration request.

As another example, the predetermined set of calibration rules may include a rule to prioritize secondary display calibration requests. For example, in some scenarios, a user or manufacturer may seek to prevent the information processing apparatus (1) from shutting down. Therefore, an automatic attempt to lower the brightness of the display (110) in response to a low power supply (e.g., low battery) may be given a higher priority to prevent the information processing apparatus (1) from shutting down. Secondary requests may be generally executed in response to determining that there are no requests from applications (220). However, the evaluation of all requests depends on the specific rules set forth in the predetermined set of calibration rules (250).

Figure 3:
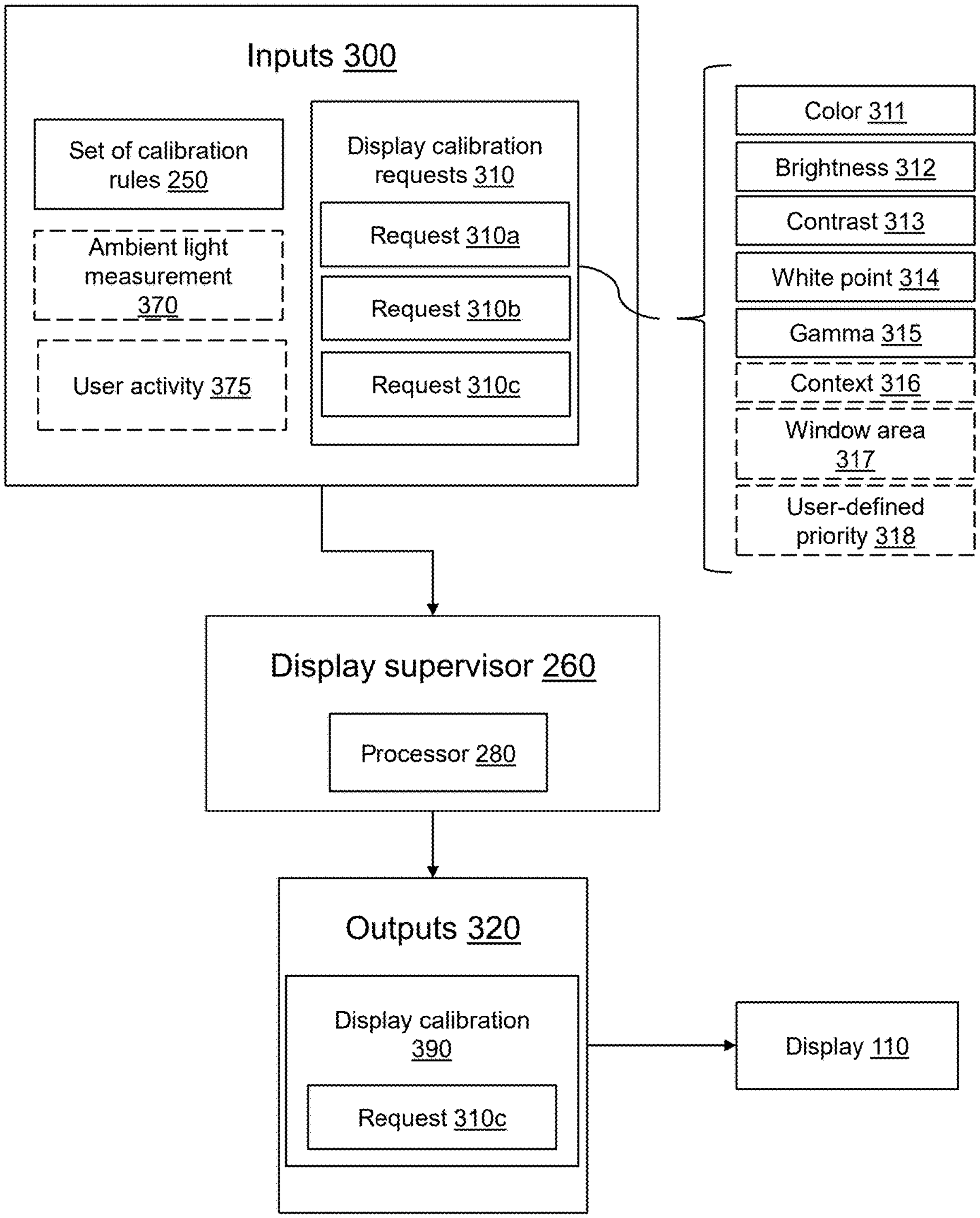
FIG. 3 depicts an input and output structure according to one or more embodiments of the disclosure.

FIG. 3 depicts the basic input and output structure of the display supervisor (260) for calculating and applying a display calibration (290) of the display (110), in accordance with one or more embodiments. As depicted, the display supervisor (260) receives multiple inputs (300) and calculates outputs (320) including a display calibration (390) of the display (110). Subsequently, the display supervisor (260) applies the display calibration (390) to the display (110).

As described above, the inputs (300) include the predetermined set of calibration rules (250) and the display calibration requests (310) that are transmitted by applications (220) registered in the memory (200) and registered in the registry of display-calibration-consuming applications (230). In some embodiments, the inputs (300) also include an ambient light measurement (370) measured by the light sensor (270) and a measurement of user activity (375) measured from the input device (275). The inputs may also include display calibration requests from other components of the information processing apparatus (1), for example, automatic attempts to calibrate the display (110) based on default settings or other sources, as described above.

In accordance with one or more embodiments, a display calibration request is a request to set the display (110) to a specific value or combination of values of color (311) (either color accuracy or gamut), brightness (312), contrast (313), white point (314), or gamma (315). Generally, one application transmits one display calibration request at a given time. Over time, a single application may transmit multiple different display calibration requests. FIG. 3 depicts one moment in time, and as depicted, three display calibration requests (310*a*, 310*b*, 310*c*) are transmitted as part of the display calibration requests (310), implying that there are three applications registered in the registry of display-calibration-consuming applications (230) that are actively attempting to calibrate the display (110). As described above, one of the display calibration requests (310) may instead originate from another component of the information processing apparatus (1), for example, a default setting that attempts to control the calibration of the display (110). Each display calibration request may seek a different value of color (311), brightness (312), contrast (313), white point (314), and gamma (315).

Each of the display calibration requests (310) may also include its own metadata such as application context (316), window area (317), and a user-defined priority value (318). The metadata is used to assist in evaluating which display calibration request (e.g., display calibration request (310*a*), display calibration request (310*b*), or display calibration request (310*c*)) to prioritize based on the predetermined set of calibration rules (250) as described above in reference to FIG. 2.

One or more applications registered in the registry of display-calibration-consuming applications (230) may be configured to transmit display calibration requests (310) based on a predetermined set of request rules. For example, an application may be configured to only transmit a display calibration request after it has been used for a certain duration of time or after its window area is greater than a predetermined minimum size. Alternatively or in addition, an application may be configured to only transmit a display calibration request when the time elapsed since its last use is less than a predetermined minimum value. Alternatively or in addition, an application may be configured to only transmit a display calibration request when the application is used to perform a predetermined function. For example, a video playing application may allow a user to select videos and play a selected video. The video playing application may not transmit a display calibration request while a user is browsing videos and instead only transmit a display calibration request after a video has been selected. Various other rules for governing the transmission of display calibration requests (310) are not beyond the scope of the present disclosure.

As described above, the display supervisor (260) calculates the display calibration (390) based on the display calibration requests (310) and the predetermined set of calibration rules (250). Applying the display calibration (390) to the display (110) includes adjusting at least the brightness value and the color value of the display (110) but may also include adjusting the contrast (313), white point (264), and gamma (265) as well. Accordingly, unless two display calibration requests (310) are identical, only one display calibration request (310) can be satisfied at a given moment. Consequently, the display calibration (390) generally denies at least a subset of the display calibration requests (310). In the example depicted in FIG. 3, the display calibration (390) denies display calibration request (310*a*) and display calibration request (310*b*), while display calibration request (310*c*) is selected and applied to the display (110).

While interacting with the information processing apparatus (1), both the display calibration requests (310) and the user activity (375) may change, depending on the applications being used. Similarly, changes in the environment over time may result in different ambient light measurements (370). In addition, a user may choose to update the set of calibration rules (250). Thus, the display supervisor (260) monitors all activity from the inputs (300) and calculates a new display calibration (390) to reflect changes in the inputs (300) as they occur. The display supervisor (260) may receive updates to the inputs (300) with a predetermined frequency (e.g., every 0.1 second, every 0.5 seconds, every 1 second, every 30 second, up to and including multiples of minutes). Alternatively, or in addition, the display supervisor (260) may receive updates to the inputs (300) based on the respective properties of each input (e.g., based on a measurement frequency associated with the ambient light measurement (370)).

Figure 4:
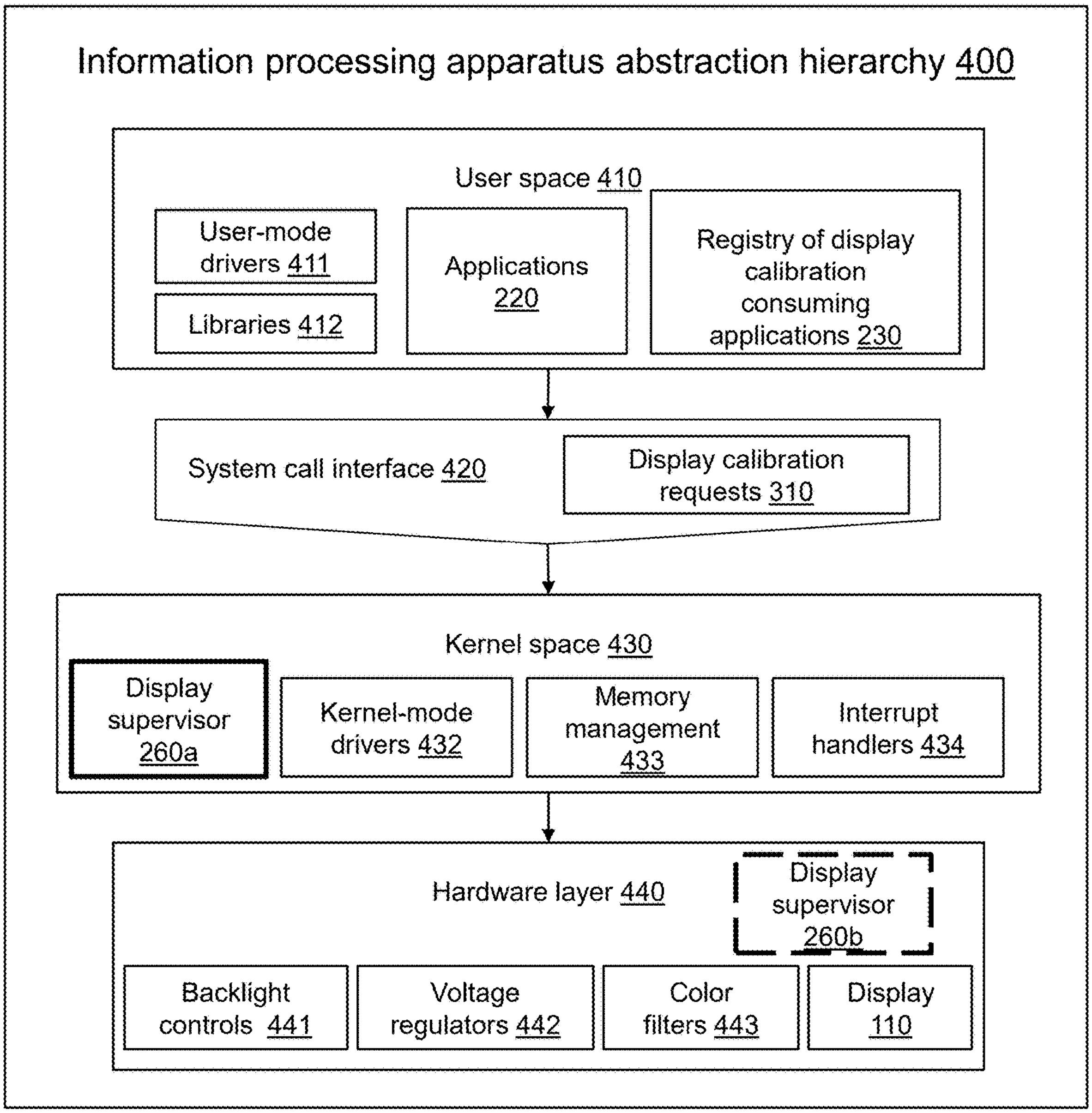
FIG. 4 depicts an information processing apparatus abstraction hierarchy according to one or more embodiments of the disclosure.

FIG. 4 depicts an information processing apparatus abstraction hierarchy (400) in accordance with one or more embodiments. The layers of the information processing apparatus abstraction hierarchy (400) describe how processes and functions are executed by a user interacting with the information processing apparatus (1). Four layers are depicted, including a user space (410), system call interface (420), kernel space (430), and hardware layer (440). Different functions performed by the information processing apparatus (1) occur at different levels. In the context of controlling the calibration of the display, requests to calibrate originate at the user space (410) and are enacted at the hardware layer (440).

The user space (410) includes user-mode drivers (411) and libraries (412). The user-mode drivers (411) are software components that translate application-level requests into device-specific operations and manage device-related data for applications. The libraries (412) are collections of precompiled code and routines that applications (220) in user space can call to perform common functions without reimplementing them. Accordingly, the applications (220) and the registry of display calibration consuming applications (230) may also be interacted with in the user space (410), and requests from the applications (220) may be executed using the user-mode drivers (411) and libraries (412). As described above, the applications (220) registered in the registry of display-calibration-consuming applications (230) transmit the display calibration requests (310) at the user space (410).

The user-mode drivers (411) communicate requests, such as the display calibration requests (310), through the system call interface (420) to the next lower level of the information processing apparatus abstraction hierarchy (400), the kernel space (430). In this way, the system call interface (420) acts as a controlled gateway that validates requests and switches the processor from user mode to kernel mode where execution privileges are greater, and routes function calls to appropriate kernel subsystems while maintaining system security and stability.

The kernel space (430) is a protected region within memory where the operating system kernel executes with full hardware privileges, managing system resources, device drivers, memory management, and process scheduling while providing controlled access to hardware through system calls from programs operating in user space (410). The kernel space (430) includes kernel-mode drivers (432), memory management (433) routines and subsystems, and interrupt handlers (434). The kernel-mode drivers (432) are software components that translate the requests from user-space to hardware-level commands. The memory management (433) routines and subsystems are kernel components that handle virtual memory allocation, page table management, memory mapping, and coordination to provide memory protection and efficient resource distribution across processes and requests. The interrupt handlers are kernel routines that respond immediately to hardware interrupt signals, temporarily suspending current execution to process urgent events such as signals from input devices (e.g., input device (275)), network packets, or timer expiration before resuming normal operation. By definition, only authorized components of the information processing apparatus (1) operating system can function within the kernel-space (430).

The kernel space (430) communicates requests to the hardware layer (440). In the context of controlling the display (110), the hardware layer includes backlight controls (441), voltage regulators (442), and color filters (443) that each may affect the calibration and appearance of the display (110) and specifically, the color (either color accuracy or gamut), brightness, contrast, white point, and gamma. Specifically, backlight controls (441) directly affect brightness and can influence white point (color temperature) and contrast ratios. Voltage regulators (442) control the power supplied to pixels, which affects brightness levels, contrast (by controlling how dark or bright pixels can get), and can influence gamma response curves. Color filters (443) directly determine color accuracy and gamut by controlling which wavelengths of light pass through to create the final displayed colors and can also affect overall brightness and contrast by filtering out certain light frequencies. Other hardware components that affect the appearance of the display (110) are known in the art and may be included in the hardware layer (440).

In one or more embodiments, the display supervisor (260) operates within the kernel space (430) as display supervisor (260*a*). The display supervisor (260) may also include a specific hardware component, such as a dedicated microprocessor or specialized integrated circuit, within the hardware layer (440) referred to as display supervisor (260*b*). In either case, the display supervisor (260*a*, 260*b*) operates at the necessary abstraction level to receive all display calibration requests (310) from the system call interface (420) as well as calculate and apply the appropriate calibration to the display (110) without competing with other applications or requests within the information processing apparatus (1). In other words, integrating the display supervisor (260*a*, 260*b*) within the kernel space (430) and/or the hardware layer (440) ensures that the calibration calculated and applied by the display supervisor (260*a*, 260*b*) is not preempted by other attempts to control the appearance of the display (110).

Figure 5:
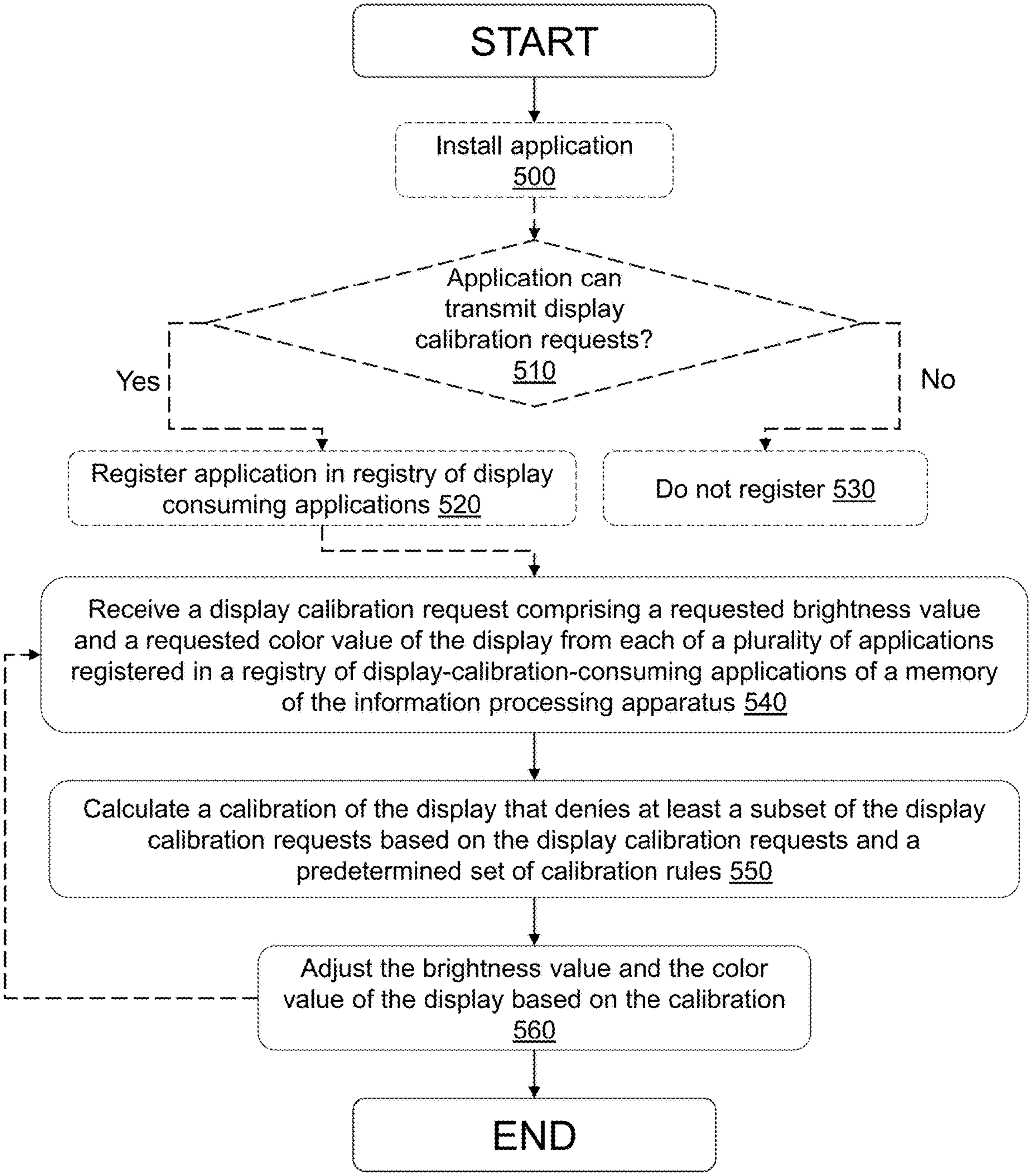
FIG. 5 depicts a method for controlling an information processing apparatus in accordance with one or more embodiments of the disclosure.

FIG. 5 depicts a method of controlling a calibratable display (110) of an information processing apparatus (1) that operates according to an adjustable brightness value and an adjustable color value, in accordance with one or more embodiments. The steps of the method of FIG. 5 can be performed, in part, using the processor (280), for example as part of the display supervisor (260).

As described above, applications may be pre-installed in the information processing apparatus (1) and new applications may be installed later. For example, a new application may be downloaded (e.g., from a network (210)) and subsequently installed. In Step 500, an application is installed. The information processing apparatus (1) or the application itself may determine whether an application should be registered in the registry of display-calibration-consuming applications (230). At Step 510, the information processing apparatus (1) attempts to determine whether the installed application is capable of transmitting display calibration requests to change the brightness or color of the display (110). The application may provide installer package metadata or a manifest that instructs the information processing apparatus (1) that the application is a consumer of display calibration resources. An application that consumes display calibration resources is registered in a registry of display-calibration-consuming applications (230) in the memory (200) at Step 520. Alternatively, if no such metadata or manifest is provided, the application not registered in the registry of display-calibration-consuming applications (230) at Step 530. At a future moment in time, if the application attempts to transmit a display calibration request, it will be momentarily denied and the application registered in the registry of display-calibration-consuming applications (230). Once registered, the request may be reevaluated in view of other requests transmitted by applications stored in the registry of display-calibration-consuming applications (230).

At Step 540, a display calibration request (310) that includes a requested brightness value and a requested color value of the display is received from each of a plurality of applications registered in the registry of display-calibration-consuming applications (230) of the memory (200). As described above, a display calibration request may further include a requested value of contrast, white point, and gamma, or any combination of the aforementioned visual properties. Each of the display calibration requests (310)

may also include metadata indicating application context (316), window area (317), and a user-defined priority value (318). Application context (316) describes the importance of calibrating the display (110) for proper functionality or user experience of the application. For example, satisfying the display calibration request of an image or video-editing application may be more important for proper functionality or user experience compared to a text-editing application. The context (316) may be provided by the application itself or estimated based on the amount of calibration resources requested. The window area (317) describes the area of an electronic window of the application graphically represented on the display (110), such as a graphical user interface (GUI), and may be measured relative to the size of the display or in units of pixels. The user-defined priority value (318) quantifies or ranks the relative importance of each application for calibrating the display (110) based on a user's own preference. In some instances, not every application is given a user-defined priority value (318) but only a subset of the applications. Applications with no user-defined priority value (318) are considered to have the lowest priority, equal to one another.

One or more applications registered in the registry of display-calibration-consuming applications (230) may be configured to transmit display calibration requests (310) based on a predetermined set of request rules. Various request rules have been described above, including only transmitting a display calibration request after an application has been used for a certain duration of time or after its window area is greater than a predetermined minimum size, when the time elapsed since the applications last use is less than a predetermined minimum value, and when the application is used to perform a predetermined function. Various other rules for governing the transmission of display calibration requests (310) are not beyond the scope of the present disclosure.

At Step 550, a calibration (390) of the display (110) that denies at least a subset of the display calibration requests (310) is calculated based on the display calibration requests (310) and a predetermined set of calibration rules (250). Unless two display calibration requests (310) are identical, only one of the display calibration request (310) can be satisfied at a given moment in time. Accordingly, the display calibration requests (310) are evaluated in view of the predetermined set of calibration rules (250) to determine the display calibration (390). Various calibration rules have been described above and may include prioritizing display calibration requests (310) based on the time of the request (e.g., prioritizing more recent requests or prioritizing older requests), the time since the last user interaction with the application or the duration of user interaction with the application, the context of the application use, the window size of the application, and the user-defined priority of the application. User activity (375) may be measured by the application itself or based on signals from an input device (275) of the information processing apparatus.

At Step 560, the brightness value and the color value of the display (110) is adjusted based on the calibration. In instances where other values are included in the display calibration requests (310) and the calculated display calibration (390) (e.g., contrast, white point, gamma), these values of the display (110) are also adjusted accordingly. The adjustment is made through interaction with hardware in the display (110), such as backlight controls (441), voltage regulators (442), and color filters (443), among other components known in the art.

In one or more embodiments, the method also includes receiving an ambient light measurement (370) from a light sensor (270) of the information processing apparatus and calculating the display calibration (390) of the display (110) based on the ambient light measurement (370). The display calibration (390) of the display may be adjusted based on the ambient light measurement (370) or may modify the prioritization of the display calibration requests (310). For example, in a low-light setting, display calibration requests (310) with high brightness may be given a lower priority, while in a bright setting, display calibration requests (310) with high brightness may be given a higher priority.

After Step 560, the method may repeat at Step 500 as new applications are installed. Similarly, upon the receipt of new display calibration requests, the method may repeat at Step 540 to calculate a new calibration of the display based on the new display calibration requests. Other actions may also cause the method to repeat at Step 540. For example, a change in user activity from one application to another may require that a new display calibration (390) is calculated, depending on the predetermined set of calibration rules (250)). In addition, a change in the ambient light measurement (370) may require that a new display calibration (390) of the display (110) is calculated.

In one or more embodiments, the method also includes (e.g., at Step 540), receiving a secondary display calibration request comprising a requested brightness value and a requested color value of the display from a source other than one of the plurality of applications (220) registered in the registry of display-calibration-consuming applications (230). Under these conditions, the calibration (390) of the display (110) is calculated (e.g., at Step 550) based on the secondary display calibration request as well as the other display calibration requests (310) and the predetermined set of calibration rules (250). Further, calculating the calibration of the display may include denying the second display calibration request based on a calibration rule belonging to the predetermined set of calibration rules (250) that prioritizes requests from applications (220) over the secondary display calibration request. Alternatively, or in addition, calculating the calibration of the display may include prioritizing the second display calibration request based on a calibration rule belonging to the predetermined set of calibration rules (250).

The method depicted in FIG. 5 may be performed in part by the processor (280), as part of the display supervisor (260), operating within a protected kernel space (430) of the memory (200) accessible only by authorized kernel-mode components of an operating system of the information processing apparatus (1). Alternatively, or in addition, the method depicted in FIG. 5 may be performed in part using a specific hardware component, such as a dedicated microprocessor or specialized integrated circuit, within the hardware layer (440). Integrating performing the method in part with a processor (280) operating within the kernel space (430) and/or through another component the hardware layer (440) ensures that the display calibration (390) that is calculated and applied to the display (110) is not preempted by other attempts to control the appearance of the display (110).

One or more of the individual processes shown in FIG. 5 may be omitted, repeated (e.g., performed in series or parallel for multiple displays (110)), combined, and/or performed in a different order than the order shown in this disclosure. Each process may be implemented by hardware (e.g., circuitry, physical components), software (e.g., machine code, programming on non-transitory computer readable media), or any combination thereof. Additional processes may be performed. Accordingly, the scope of the invention should not be limited by the specific arrangement as depicted in FIG. 5.

Embodiments of the disclosure have one or more of the following advantages. First, embodiments of the present disclosure include an information processing apparatus that effectively manages and responds to multiple, possibly conflicting, calibration requests from different applications. Second, the calibration of the display is determined according to a set of predetermined calibration rules, providing an evenhanded, consistent and uniform response to calibration requests. Third, embodiments disclosed here may allow the user, developer, or manufacturer to define and update the predetermined set of calibration rules. Fourth, user idiomatic display adjustments can be maintained when calibration is not needed while ensuring automatic transition to a calibrated state when display accuracy is paramount. Fifth, the embodiments disclosed here prevent calibration interference from power management, environmental, and autonomic system management factors. Sixth, multiple calibrations can be maintained in simultaneous use and the most relevant one engaged at any moment. Lastly, a consistent and uniform response is ensured by performing aspects of the present disclosure within the kernel-space or hardware layer of the information processing apparatus, rather than within user space.

Embodiments of the present disclosure are compatible with applications installed by developers and manufacturers (e.g., pre-installed) and new applications downloaded to the information processing apparatus. Applications themselves and/or the information processing apparatus can determine whether an application is a consumer of display calibration resources. Applications that are consumers of display calibration resources are registered in a partitioned area of the memory, thereby simplifying the management of display calibration requests by uniquely identifying all applications (e.g., by a moniker) that can transmit display calibration requests from those that cannot. The registry may include additional information related to each application, for example, specific display calibrations that may be quickly loaded through lookups. Further, embodiments disclosed herein actively maintain a calibration of the display in response to changes in the environment, user activity, and application activity, without the need for direct user intervention.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An information processing apparatus, comprising:
- a calibratable display that operates according to an adjustable brightness value and an adjustable color value;
- a memory that stores instructions; and
- a processor that executes the instructions to:
  - receive a display calibration request comprising a requested brightness value and a requested color value of the display from each of a plurality of applications registered in a registry of display-calibration-consuming applications of the memory,
  - calculate a calibration of the display that denies at least a subset of the display calibration requests based on the display calibration requests and a predetermined set of calibration rules, and
  - adjust the brightness value and the color value of the display based on the calibration.

2. The information processing apparatus of claim 1, wherein the predetermined set of calibration rules comprises:
- prioritizing the display calibration requests based on a user activity of each of the plurality of applications, an application window area of each of the plurality of applications, and a user-defined priority of each of the plurality of applications.

3. The information processing apparatus of claim 1, further comprising a light sensor;
- wherein the processor executes the instructions to receive a light measurement from the light sensor and calculates the calibration of the display based on the light measurement.

4. The information processing apparatus of claim 1, wherein the processor executes the instructions to:
- detect whether a new application is installed to the memory, and
- in response to detecting that a new application is installed to the memory:
  - determine whether the application can transmit display calibration requests to change the brightness or a color of the display, and
  - in response to determining that the application can transmit display calibration requests, register the application in the registry of display-calibration-consuming applications.

5. The information processing apparatus of claim 1, wherein the processor executes the instructions within a protected kernel space of the memory accessible only by authorized kernel-mode components of an operating system of the information processing apparatus.

6. The information processing apparatus of claim 1, wherein the processor executes the instructions to:
- receive a secondary display calibration request comprising a requested brightness value and a requested color value of the display from a source other than one of the plurality of applications registered in the registry of display-calibration-consuming applications; and
- calculate the calibration of the display based on the secondary display calibration request.

7. The information processing apparatus of claim 6, wherein calculating the calibration of the display comprises denying the second display calibration request based on a calibration rule belonging to the predetermined set of calibration rules that prioritizes requests from applications over the secondary display calibration request.

8. The information processing apparatus of claim 6, wherein calculating the calibration of the display comprises prioritizing the second display calibration request based on a calibration rule belonging to the predetermined set of calibration rules.

9. The information processing apparatus of claim 1, wherein at least one of the plurality of applications registered in the registry of display-calibration-consuming applications is configured to transmit display calibration requests based on a predetermined set of request rules.

10. A method of controlling a calibratable display of an information processing apparatus that operates according to an adjustable brightness value and an adjustable color value, the method comprising:
- receiving a display calibration request comprising a requested brightness value and a requested color value of the display from each of a plurality of applications registered in a registry of display-calibration-consuming applications of a memory of the information processing apparatus, calculating a calibration of the display that denies at least a subset of the display calibration requests based on the display calibration requests and a predetermined set of calibration rules, and adjusting the brightness value and the color value of the display based on the calibration.

11. The method of claim 10, wherein the predetermined set of calibration rules comprises:

prioritizing the display calibration requests based on a user activity of each of the plurality of applications, an application window area of each of the plurality of applications, and a user-defined priority of each of the plurality of applications.

12. The method of claim 10, wherein the information processing apparatus comprises a light sensor and the method further comprises:

receiving a light measurement from the light sensor; and calculating the calibration of the display based on the light measurement.

13. The method of claim 10, further comprising:

detecting whether a new application is installed to the memory; and in response to detecting that a new application is installed to the memory:

determining whether the application can transmit display calibration requests to change the brightness or the color of the display, and in response to determining that the application can transmit display calibration requests, registering the application in the registry of display-calibration-consuming applications.

14. The method of claim 10, wherein the receiving, the calculating, and the adjusting are executed within a protected kernel space of the memory accessible only by authorized kernel-mode components of an operating system of the information processing apparatus.

15. The method of claim 10, wherein at least one of the plurality of applications registered in the registry of display-calibration-consuming applications is configured to transmit display calibration requests based on a predetermined set of request rules.

16. The method of claim 10, further comprising:

receiving a secondary display calibration request comprising a requested brightness value and a requested color value of the display from a source other than one of the plurality of applications registered in the registry of display-calibration-consuming applications; and calculating the calibration of the display based on the secondary display calibration request.

17. The method of claim 16, wherein calculating the calibration of the display comprises denying the second display calibration request based on a calibration rule belonging to the predetermined set of calibration rules that prioritizes requests from applications over the secondary display calibration request.

18. The method of claim 16, wherein calculating the calibration of the display comprises prioritizing the second display calibration request based on a calibration rule belonging to the predetermined set of calibration rules.

* * * * *